US011295717B2

(12) United States Patent
Garnier

(10) Patent No.: US 11,295,717 B2
(45) Date of Patent: Apr. 5, 2022

(54) ACOUSTIC ABSORPTION STRUCTURE COMPRISING CELLS WITH AT LEAST ONE ANNULAR CANAL, AIRCRAFT PROPULSION SYSTEM COMPRISING SAID STRUCTURE

(71) Applicant: Airbus Operations S.A.S., Toulouse (FR)

(72) Inventor: César Garnier, Toulouse (FR)

(73) Assignee: Airbus Operations S.A.S.

( * ) Notice: Subject to any disclaimer, the term of this patent is extended or adjusted under 35 U.S.C. 154(b) by 204 days.

(21) Appl. No.: 16/659,793

(22) Filed: Oct. 22, 2019

(65) Prior Publication Data

US 2020/0143785 A1    May 7, 2020

(30) Foreign Application Priority Data

Nov. 6, 2018    (FR) ...................................... 18 60179

(51) Int. Cl.
| | |
|---|---|
| *G10K 11/168* | (2006.01) |
| *B32B 3/12* | (2006.01) |
| *B64D 33/02* | (2006.01) |
| *F02C 7/045* | (2006.01) |

(52) U.S. Cl.
CPC ............. *G10K 11/168* (2013.01); *B32B 3/12* (2013.01); *B32B 2307/102* (2013.01); *B32B 2605/18* (2013.01); *B64D 2033/0206* (2013.01); *F02C 7/045* (2013.01)

(58) Field of Classification Search
CPC .................................................... G10K 11/168
See application file for complete search history.

(56) References Cited

U.S. PATENT DOCUMENTS

| | | | | |
|---|---|---|---|---|
| 2,153,357 A | * | 4/1939 | Wente | .................... E04B 1/8409 |
| | | | | 181/291 |
| 2,177,393 A | * | 10/1939 | Parkinson | ............... E04B 9/045 |
| | | | | 52/145 |
| 2009/0050404 A1 | | 2/2009 | Corin | |
| 2010/0301161 A1 | | 12/2010 | Chene et al. | |
| 2019/0323522 A1 | * | 10/2019 | McNair | .................... F02C 7/045 |

FOREIGN PATENT DOCUMENTS

| | | |
|---|---|---|
| EP | 3242293 A1 | 11/2017 |
| FR | 2950289 A1 | 3/2011 |

* cited by examiner

*Primary Examiner* — Mark Ruthkosky
*Assistant Examiner* — Julia L Rummel
(74) *Attorney, Agent, or Firm* — Lerner, David, Littenberg, Krumholz & Mentlik, LLP

(57) ABSTRACT

An acoustic absorption structure includes: a porous layer in contact with a medium through which the sound waves travel, a cellular layer including a plurality of cells, which has at least one exterior annular canal open towards the porous layer, and a reflective layer. An aircraft propulsion system having at least one such acoustic absorption structure is also described.

12 Claims, 4 Drawing Sheets

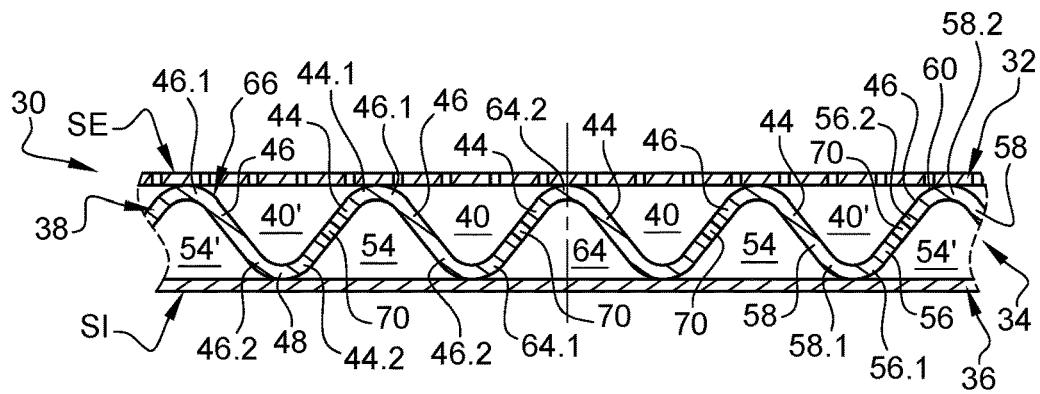
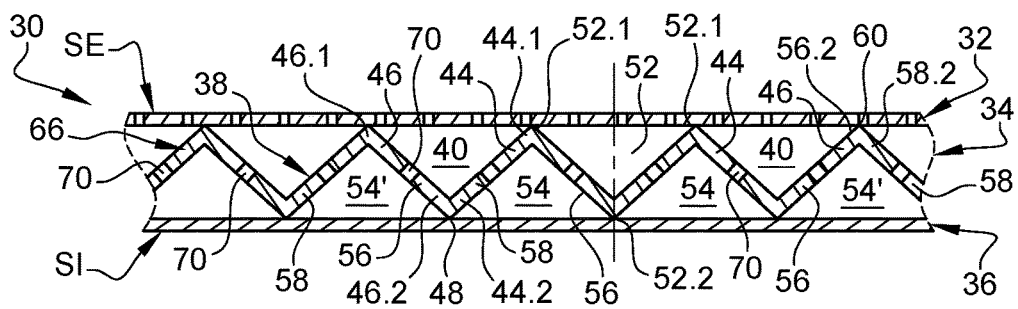
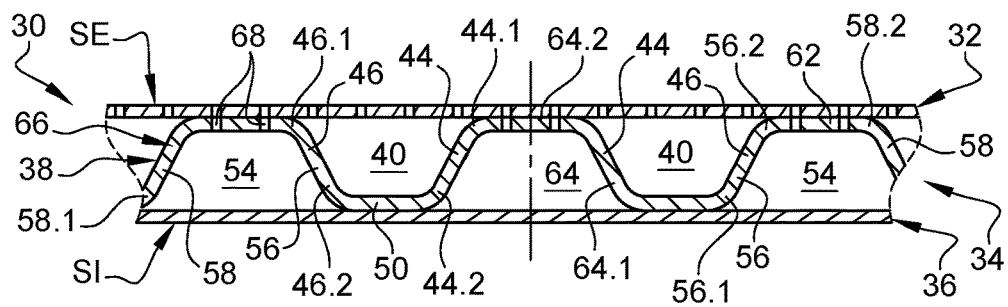
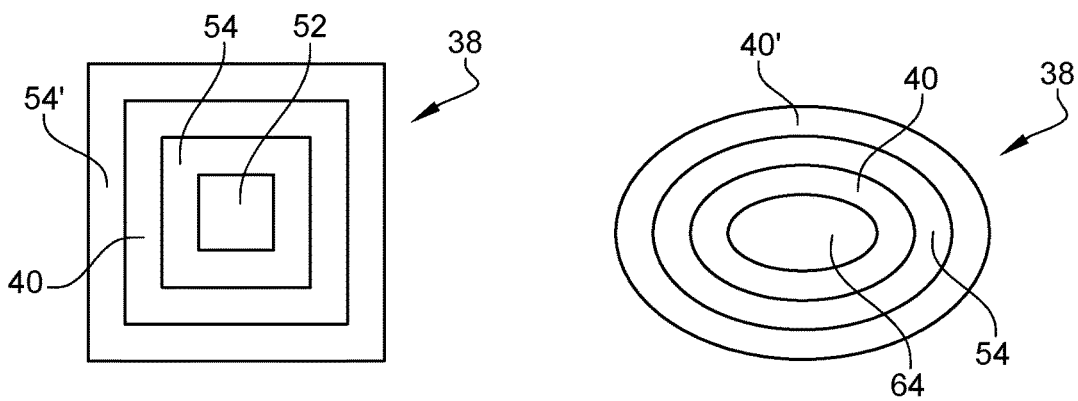
Fig. 5　Fig. 6　Fig. 7　Fig. 8　Fig. 9

ACOUSTIC ABSORPTION STRUCTURE COMPRISING CELLS WITH AT LEAST ONE ANNULAR CANAL, AIRCRAFT PROPULSION SYSTEM COMPRISING SAID STRUCTURE

FIELD OF THE INVENTION

The present application relates to an acoustic absorption structure comprising cells with at least one annular canal and to an aircraft propulsion system comprising said structure.

BACKGROUND OF THE INVENTION

According to a first known configuration visible in FIG. 1, an acoustic absorption structure 10 comprises, from the outside towards the inside, a porous layer 12, a cellular layer 14 and a reflective layer 16.

The porous layer 12 has a dissipative role, partially converting the acoustic energy of the sound wave passing through it into heat. This porous layer 12 is notably characterized by an open surface ratio that essentially varies according to the frequency or frequency band of the noise that is to be attenuated.

The cellular layer 14 is a honeycomb structure which exhibits a multitude of identical juxtaposed cavities of hexagonal, square or rectangular and tubular cross section, having a first end opening onto the porous layer 12 and a second end opening onto the reflective layer 16.

Such an acoustic absorption structure allows noise to be attenuated for a given frequency or a narrow band of frequencies.

According to a second configuration visible in FIG. 2, an acoustic absorption structure 10' comprises, from the outside towards the inside, a porous layer 12', a first cellular layer 14.1', an intermediate porous layer 18', a second cellular layer 14.2' and a reflective layer 16'. As before, each cellular layer 14.1', 14.2' is a honeycomb structure.

Such an acoustic absorption structure comprising two cellular layers 14.1', 14.2', makes it possible to increase the band of frequencies in comparison with the first embodiment. However, such a design is not fully satisfactory, because it leads to an increase in the mass and thickness of the structure.

BRIEF SUMMARY OF THE INVENTION

Aspects of the present invention may remedy all or some of the drawbacks of the prior art.

An embodiment of the invention is an acoustic absorption structure comprising an exterior surface in contact with a medium through which sound waves travel, and an interior surface, on the opposite side to the exterior surface, said acoustic absorption structure comprising, from the exterior surface towards the interior surface, a porous layer, a cellular layer comprising a plurality of cells, and a reflective layer.

According to an embodiment of the invention, each cell comprises at least one exterior annular canal, delimited by two concentric first lateral walls, each first lateral wall comprising a first edge, connected to the porous layer, and a second edge, distant from the porous layer, the first edges of the first lateral walls being distant from one another and the second edges of the first lateral walls being connected by a first crest line or by a first bottom.

This acoustic absorption structure allows the noise to be attenuated over a broad band of frequencies.

According to another feature, the cell comprises several concentric exterior annular canals.

According to one configuration, the first crest line and/or the first bottom are against the reflective layer.

According to another feature, the cell comprises at least one interior annular canal, delimited by two concentric second lateral walls, each second lateral wall comprising a first edge, connected to the reflective layer, and a second edge, distant from the reflective layer, the first edges of the second lateral walls being distant from one another and the second edges of the second lateral walls being connected by a second crest line or by a second bottom.

According to another feature, the cell comprises several concentric interior annular canals.

According to one configuration, the second crest line and/or the second bottom are against the porous layer.

According to another feature, the cell comprises an alternation of exterior annular canals and of interior annular canals.

According to one configuration, the cell comprises an interior or exterior central chamber, positioned at the centre of the smallest exterior or interior annular canal, the exterior or interior central chamber being conical or frustoconical and having a base against the porous or reflective layer and a vertex or a bottom distant therefrom.

According to another feature, two contiguous exterior and interior annular canals are separated by a lateral wall shared in common.

According to another feature, each cell comprises a partition, interposed between the porous layer and the reflective layer, which has a first surface oriented towards the exterior surface and a second surface oriented towards the interior surface, the partition comprising concentric corrugations, extending from its centre, which on the first surface delimit the exterior annular canals and on the second surface delimit the interior annular canals.

According to another feature, the cell comprises orifices allowing each interior annular canal to communicate with the exterior surface.

According to a first alternative form, the orifices are positioned in the region of the second bottom of at least one interior annular canal.

According to another alternative form, the cell comprises orifices positioned in such a way as to cause at least one interior annular canal to communicate with at least one of the contiguous exterior annular canals.

The invention also relates to an aircraft propulsion system comprising at least one acoustic absorption structure according to one of the preceding features.

BRIEF DESCRIPTION OF THE DRAWINGS

Other features and advantages will emerge from the following description of the invention, which description is given solely by way of example, with reference to the appended drawings in which:

FIG. 5 is a cross section through part of an acoustic absorption structure illustrating a first embodiment of the invention, FIG. 6 is a cross section through part of an acoustic absorption structure illustrating a second embodiment of the invention, FIG. 7 is a cross section through part of an acoustic absorption structure illustrating a third embodiment of the invention, FIG. 8 is a view from above, of a cell of a cellular layer illustrating one embodiment of the invention, FIG. 9 is a view from above, of a cell of a cellular layer illustrating another embodiment of the invention.

DETAILED DESCRIPTION

Figure 1:
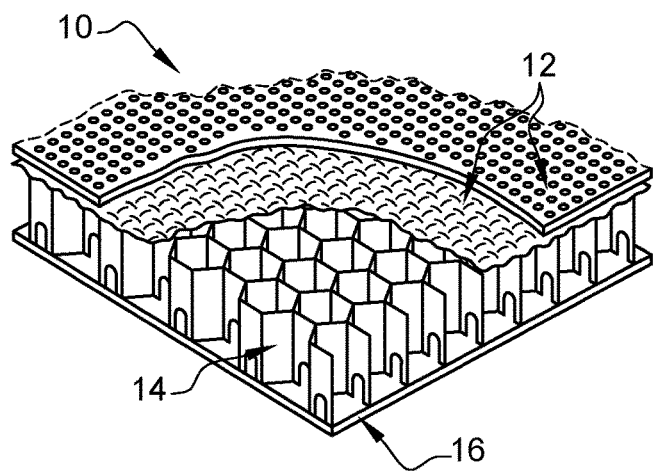
FIG. 1 is a perspective view of part of an acoustic absorption structure illustrating a first configuration of the prior art.
Figure 2:
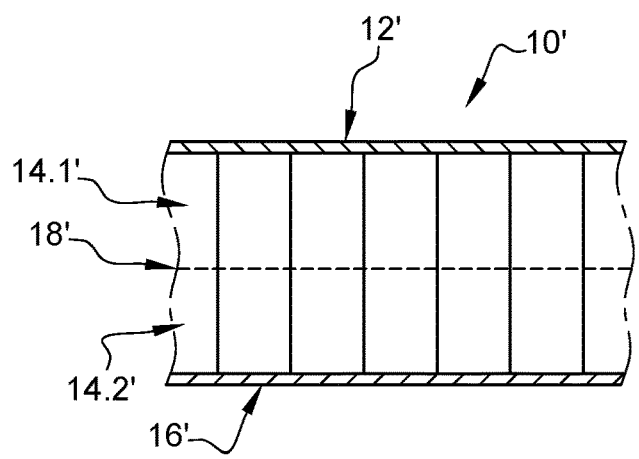
FIG. 2 is a cross section through an acoustic absorption structure illustrating a second configuration of the prior art.
Figure 3:
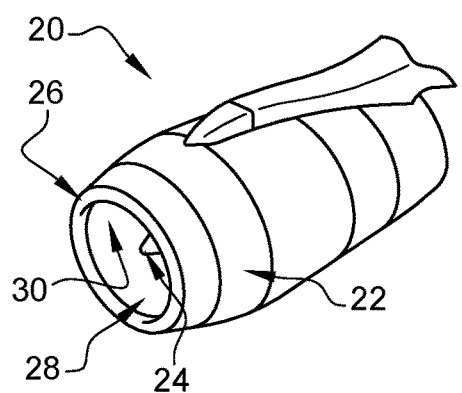
FIG. 3 is a perspective view of a propulsion system, illustrating one embodiment.

FIG. 3 depicts a propulsion system 20 comprising a nacelle 22 inside which a turbojet engine 24 is positioned. The nacelle 22 comprises an air intake 26 extended by an interior duct 28 to channel the air towards the turbojet engine 24. In order to reduce the noise emitted by the propulsion system 20, surfaces of the nacelle 22 and of the turbojet engine 24 covered with acoustic absorption structures 30. This is notably the case with the interior duct 28.

Although described in an application to an aircraft propulsion system, the acoustic absorption structure 30 is not in any way restricted to that application. Thus, the acoustic structure according to an embodiment of the invention may cover any other surface (of an aircraft or something else).

For the sake of simplicity, the acoustic absorption structures described in the various figures are in the form of flat panels. Of course, the invention is not in any way limited to this geometry. The acoustic absorption structures may equally be curved. In all cases, each acoustic absorption structure has a geometry identical to that of the support to which it is applied.

Whatever its geometry, an acoustic absorption structure comprises a first surface, referred to as the exterior surface SE, in contact with a medium through which sound waves travel, and a second surface, referred to as the interior surface SI, on the opposite side to the exterior surface SE. The acoustic absorption structure has a height (the distance separating the exterior and interior surfaces SE, SI) that is smaller than the dimensions of the exterior and interior surfaces SE, SI.

As illustrated in FIGS. 4 to 7, an acoustic absorption structure 30 comprises, from the exterior surface SE towards the interior surface SI, a porous layer 32, a cellular layer 34 and a reflective layer 36.

The porous layer 32 is configured to allow air and sound waves to pass through.

The porous and reflective layers 32, 36 are not described any further because they may be identical to those of acoustic absorption structures of the prior art.

Figure 10:
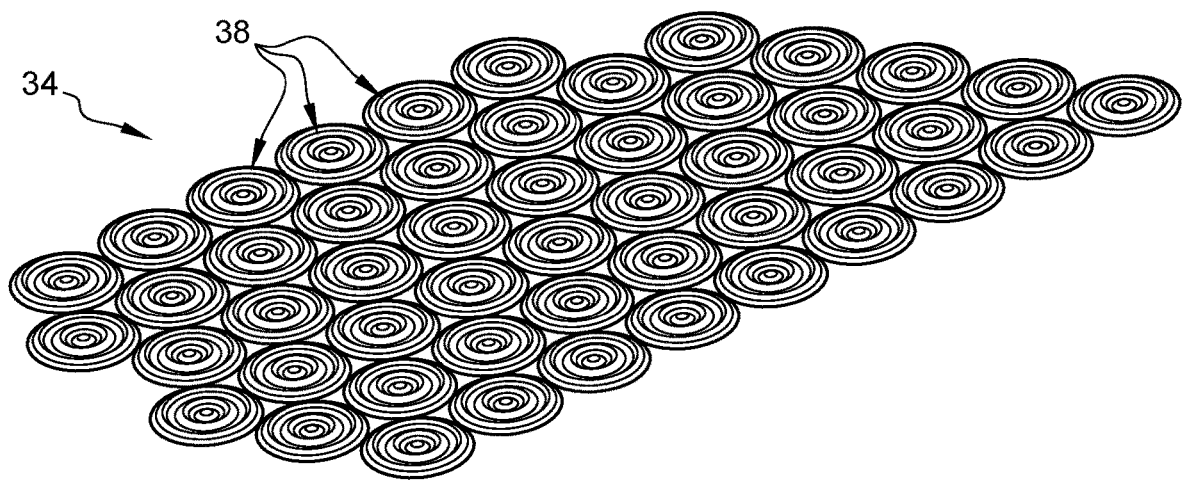
FIG. 10 is a perspective view of a cellular layer illustrating one embodiment of the invention.

As illustrated in FIG. 10, the cellular layer 34 comprises a plurality of cells 38.

According to a configuration visible in FIG. 10, the cells 38 are all identical. Of course, the invention is not limited to this configuration. Thus, the cells could differ from one another, or the cellular layer 34 could comprise several zones, the cells in one and the same zone being identical, but different from one zone to another.

According to one configuration, the cells 38 are aligned in rows and/or in columns. According to one particular configuration visible in FIG. 10, the cells are aligned in several rows and arranged in a staggered configuration from one row to the next. Of course, the invention is not limited to this arrangement. Thus, the cells 38 could be arranged randomly or in a set arrangement.

Figure 4:
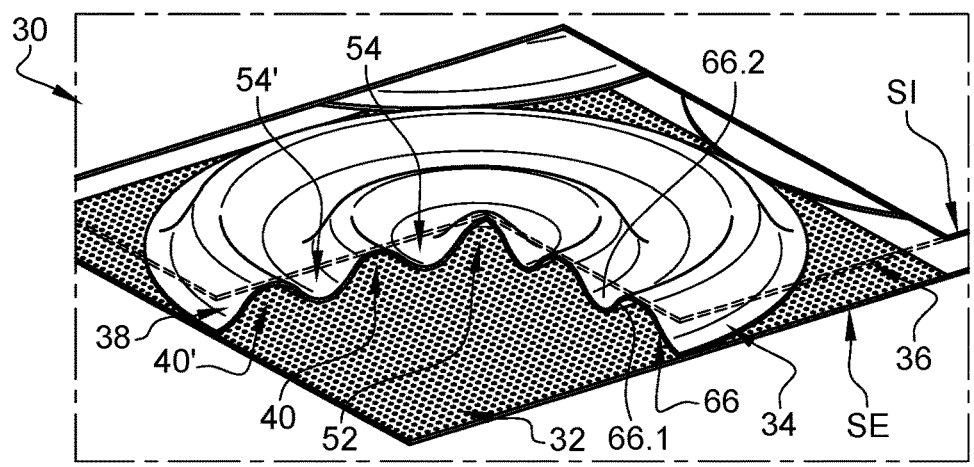
FIG. 4 is a perspective view of part of an acoustic absorption structure illustrating one embodiment of the invention.

FIG. 4 depicts in detail a cell 38, one quarter of which has been removed, for better viewing.

For the remainder of the description, a transverse plane is a plane perpendicular to the exterior surface SE and oriented in a given direction.

Each cell 38 comprises at least one exterior annular canal 40, delimited by two concentric first lateral walls 44, 46. Each first lateral wall 44, 46 comprises a first edge 44.1, 46.1, connected to the porous layer 32, and a second edge 44.2, 46.2 distant from the porous layer 32.

What is meant by an annular canal is a canal which is closed up on itself.

Each exterior annular canal 40 may describe a circle, as illustrated in FIG. 4, a square, as illustrated in FIG. 8, an ellipse, as illustrated in FIG. 9, a rectangle, an oval, or any other shape comprising at least one rectilinear portion and/or at least one curved portion. Preference is given to shapes comprising only curved portions.

According to embodiments visible in FIGS. 5 and 6, the second edges 44.2, 46.2 of the two first lateral walls 44, 46 are joined together at a first crest line 48. According to one configuration, the first crest line 48 is against the reflective layer 36. As an alternative, the first crest line 48 could be distant from the reflective layer 36. According to one embodiment visible in FIG. 6, the first lateral walls 44, 46 are planar. In that case, the first crest line 48 is a ridge. According to another embodiment visible in FIG. 5, the first lateral walls 44, 46 have a profile that is curved on each side of the first crest line 48 which corresponds to a generatrix of a curved portion.

According to another embodiment visible in FIG. 7, the second edges 44.2, 46.2 of the two first lateral walls are distant and are connected by a first bottom 50 distant from the porous layer 32. According to one configuration, the first bottom 50 is against the reflective layer 36. As an alternative, the first bottom 50 could be distant from the reflective layer 36.

Whatever the embodiment, the first edges 44.1, 46.1 of the first lateral walls 44, 46 delimiting each exterior annular canal 40 are distant from one another, and each exterior annular canal 40 is open in the direction of the porous layer 32. In a transverse plane, the first lateral walls 44, 46 and the first bottom 50 may each be planar, curved or comprise planar and/or curved portions.

According to one configuration, a cell 38 comprises several concentric exterior annular canals. What is meant by concentric is that the exterior annular canals do not cross or intersect one another.

According to a configuration visible in FIG. 4, a cell 38 comprises two concentric exterior annular canals 40, 40'. Of course, the invention is not restricted to this number of exterior annular canals.

According to one embodiment visible in FIGS. 4 and 6, the cell 38 comprises an exterior central chamber 52, positioned in the middle of the smallest exterior annular canal 40, and open towards the porous layer 32. According to one configuration, the exterior central chamber 52 is conical or frustoconical and has a base 52.1 against the porous layer 32 and a vertex or a bottom 52.2 distant therefrom. According to a configuration visible in FIG. 4, the vertex 52.2 has a rounded profile and is against the reflective layer 36. According to a configuration visible in FIG. 6, the vertex 52.2 could be pointed and/or distant from the reflective layer 36.

According to another feature, the cell 38 comprises at least one interior annular canal 54 delimited by two concentric second lateral walls 56, 58. Each second lateral wall 56, 58 comprises a first edge 56.1, 58.1, connected to the reflective layer 36, and a second edge 56.2, 58.2, distant from the reflective layer 36.

Like the exterior annular canal 40, the interior annular canal 54 may describe a circle, as illustrated in FIG. 4, a square, as illustrated in FIG. 8, an ellipse, as illustrated in FIG. 9, a rectangle, an oval, or any other shape comprising at least one rectilinear portion and/or at least one curved portion.

According to embodiments visible in FIGS. 5 and 6, the second edges 56.2, 58.2 of the two second lateral walls 56, 58 are joined together at a second crest line 60. According to one configuration, the second crest line 60 is against the porous layer 32. As an alternative, the second crest line 60 could be distant from the porous layer 32. According to one embodiment visible in FIG. 6, the second lateral walls 56, 58 are planar. In that case, the second crest line 60 is a ridge. According to another embodiment visible in FIG. 5, the second lateral walls 56, 58 have a profile that is curved on each side of the second crest line 60 which corresponds to a generatrix of a curved portion.

According to another embodiment visible in FIG. 7, the second edges 56.2, 58.2 of the two second lateral walls 56, 58 are distant and are connected by a second bottom 62 distant from the reflective layer 36. According to one configuration, the second bottom 62 is against the porous layer 32. As an alternative, the second bottom 62 could be distant from the porous layer 32.

Whatever the embodiment, the first edges 56.1, 58.1 of the second lateral walls 56, 58 delimiting each interior annular canal 54 are distant from one another, and each interior annular canal 54 is open in the direction of the reflective layer 36. In a transverse plane, the second lateral walls 56, 58 and the second bottom 62 may each be planar, curved or comprise planar and/or curved portions.

According to a configuration visible in FIG. 4, a cell 38 comprises two concentric interior annular canals 54, 54'. Of course, the invention is not restricted to this number of interior annular canals.

According to one embodiment visible in FIGS. 5 and 7, the cell 38 comprises an interior central chamber 64, positioned in the middle of the smallest interior annular canal 54, and open towards the reflective layer 36. According to one configuration, the interior central chamber 64 is conical or frustoconical and has a base 64.1 against the reflective layer 36 and a vertex or a bottom 64.2 distant therefrom. According to a configuration visible in FIG. 5, the vertex 64.2 is rounded and is against the porous layer 32. As an alternative, the vertex 64.2 could be pointed and/or distant from the porous layer 32.

According to embodiments visible in FIGS. 4 to 7, 11 to 13, the cell 38 comprises an alternation of exterior annular canals 40 and of interior annular canals 54. To complement this, the cell 38 comprises an exterior 52 or interior 64 central chamber positioned on the inside of the smallest interior or exterior annular canal.

According to one embodiment, two contiguous exterior 40 and interior 54 annular canals are separated by a lateral wall 44, 46, 56, 58 shared in common. Thus, the first lateral walls 44, 46 are coincident with the second lateral walls 56, 58. According to this embodiment, each cell 38 comprises a partition 66, interposed between the porous layer 32 and the reflective layer 36, which has a first surface 66.1 oriented towards the exterior surface SE and a second surface 66.2 oriented towards the interior surface SI. The partition 66 comprises concentric corrugations, extending from its centre, which on the first surface 66.1 delimit the exterior annular canals 40 and on the second surface 66.2 delimit the interior annular canals 54.

The cell 38 comprises orifices 68, 70, 72 allowing each interior annular canal 54 (not open towards the porous layer 32) to communicate with the exterior surface SE.

Figure 11:
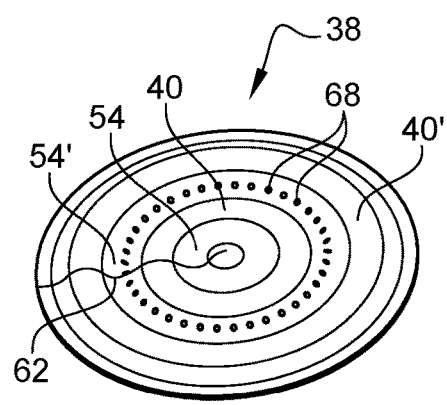
FIG. 11 is a perspective view of a cell of a cellular layer illustrating a first alternative form of embodiment of the invention.
Figure 12:
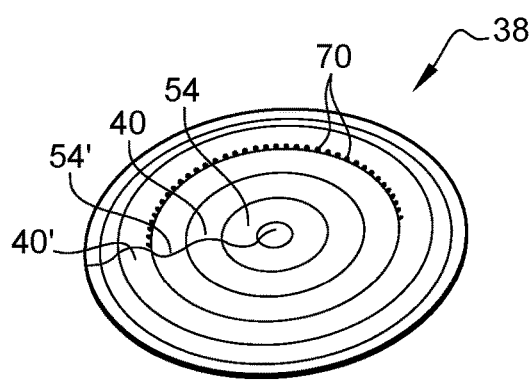
FIG. 12 is a perspective view of a cell of a cellular layer illustrating a second alternative form of embodiment of the invention.
Figure 13:
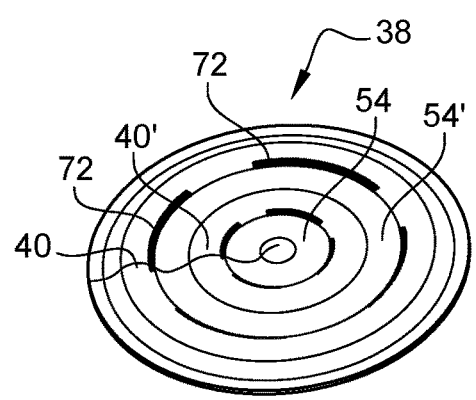
FIG. 13 is a perspective view of a cell of a cellular layer illustrating a third alternative form of embodiment of the invention.

According to a first alternative form illustrated in FIGS. 7 and 11, the orifices 68 are positioned in the region of the second bottom 62 of at least one interior annular canal 54 in order to cause the interior annular canal 54 to communicate directly with the exterior surface SE. These orifices 68 may be distributed over the entire periphery or just over certain sectors of the interior annular canal 54.

According to second and third alternative forms illustrated in FIGS. 5, 6, 12 and 13, at least one of the lateral walls 44, 46, 56, 58 of at least one interior annular canal 54 comprises orifices 70, 72 to cause the interior annular canal 54 to communicate with at least one of the contiguous exterior annular canals 40. According to these alternative forms, the interior annular canal 54 communicates with the exterior surface SE not directly but via an exterior annular canal 40. According to the second alternative form visible in FIG. 12, the orifices 70 take the form of approximately cylindrical holes distributed over the entire periphery or just over certain sectors of the interior annular canal 54. According to the third alternative form visible in FIG. 13, the orifices 72 take the form of slots distributed over the entire periphery or just over certain sectors of the interior annular canal 54.

The cells 38 may be made of metal, of composite material, of plastics material or some other material.

The cells 38 of a cellular layer 34 may be independent of one another. In that case, they are, first of all, assembled with one of the porous or reflective layers 32, 36 then covered with the other, reflective or porous, layer 36, 32.

The cells 38 of a cellular layer 34 are formed in the one same partition 66, for example by pressing.

Whatever the embodiment, the cells 38 are easier to produce than a honeycomb structure.

Figure 14:
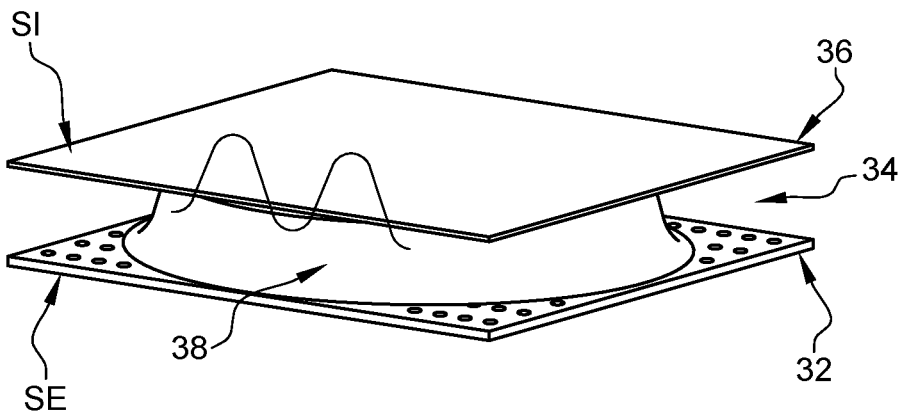
FIG. 14 is a perspective view of a cell of an acoustic absorption structure illustrating a first embodiment of the invention.
Figure 15:
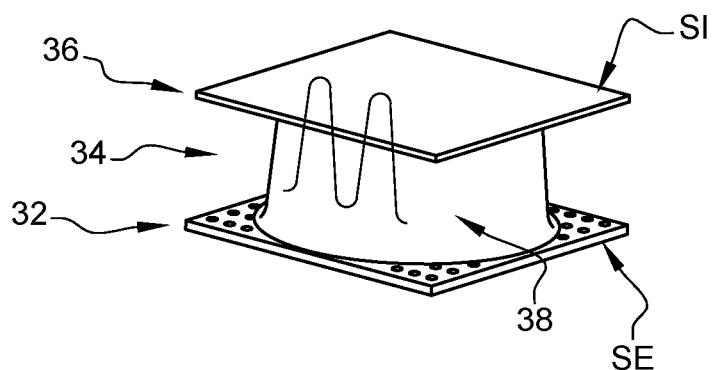
FIG. 15 is a perspective view of a cell of an acoustic absorption structure illustrating a second embodiment of the invention.
Figure 16:
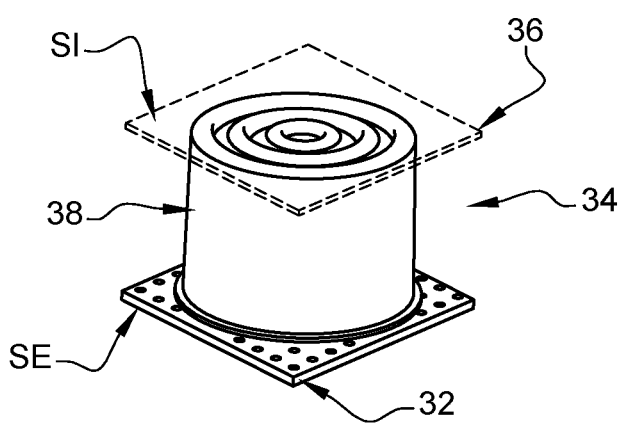
FIG. 16 is a perspective view of a cell of an acoustic absorption structure illustrating a third embodiment of the invention.

It is possible to adjust the sound attenuating characteristics by modifying the cross section of each cell 38, which may be greater or lesser, as illustrated in FIGS. 14 and 16, the height of each cell which may be greater or lesser, as illustrated in FIGS. 14 and 15, the cross section of the annular canals, which may be greater or lesser, the cross section and arrangement of the orifices 68, 70, 72. For the one same cell, the exterior annular canals 40 may have the same cross section as, or different cross section from, the interior annular canals 54, the exterior annular canals 40 may all have the same cross section or different cross sections, and the annular canals 54 may all have the same cross section or different cross sections.

The acoustic absorption structure according to the invention allows the noise to be attenuated over a broad band of frequencies. Moreover, the act of providing interior annular canals 54 interposed between exterior annular canals 40 makes it possible to obtain behaviour analogous to that of acoustic absorption panels with two superposed honeycomb structures of the prior art, while at the same time having a markedly smaller thickness.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic absorption structure comprising:
   an exterior surface configured to be in contact with a medium through which sound waves travel; and
   an interior surface, on the opposite side to the exterior surface,
   said acoustic absorption structure comprising, from the exterior surface towards the interior surface in the following order,
   a porous payer;
   a cellular layer comprising a plurality of side-by-side cells; and
   a reflective layer,
   wherein each cell comprises at least one exterior annular canal opening toward the porous layer and delimited by two concentric first lateral walls, each first lateral wall comprising a first edge, connected to the porous layer, and a second edge, distant from the porous layer, wherein the first edges of the first lateral walls are distant from one another and the second edges of the first lateral walls are connected by a first crest line or by a first bottom,
   wherein the cell comprises at least one interior annular canal; delimited by two concentric second lateral walls and the reflective layer, each second lateral wall comprising a first edge, connected to the reflective layer, and a second edge, distant from the reflective layer, wherein the first edges of the second lateral walls are distant from one another and the second edges of the second lateral walls are connected by a second crest line or by a second bottom, and
   wherein at least one of the two concentric second lateral walls or the second bottom comprises at least one orifice allowing each interior annular canal to communicate with the exterior surface.

2. The acoustic absorption structure according to claim 1, wherein the cell comprises a plurality of concentric exterior annular canals including the at least one exterior annular canal.

3. The acoustic absorption structure according to claim 1, wherein the first crest line and/or the first bottom are against the reflective layer.

4. The acoustic absorption structure according to claim 1, wherein the cell comprises a plurality of concentric interior annular canals including the at least one interior annular canal.

5. The acoustic absorption structure according to claim 1, wherein the second crest line and/or the second bottom are against the porous layer.

6. The acoustic absorption structure according to claim 1, wherein the cell comprises a plurality of concentric exterior annular canals including the at least one exterior annular canal,
   wherein the cell comprises a plurality of concentric interior annular canals including the at least one interior annular canal, and
   wherein the cell comprises an alternation of the exterior annular canals and of the interior annular canals.

7. The acoustic absorption structure according to claim 6, wherein the cell comprises an interior or exterior central chamber, positioned at the center of the smallest exterior or interior annular canal, wherein the exterior or interior central chamber is conical or frustoconical and has a base against the porous or reflective layer and a vertex or a bottom distant therefrom.

8. The acoustic absorption structure according to claim 6, wherein two contiguous exterior and interior annular canals are separated by a lateral wall shared in common.

9. The acoustic absorption structure according to claim 8, wherein the two concentric first lateral walls and the two concentric second lateral walls define a partition, interposed between the porous layer and the reflective layer, wherein the partition has a first surface oriented towards the exterior surface and a second surface oriented towards the interior surface, the partition comprising concentric corrugations, extending from a center of the partition, which on the first surface delimit the exterior annular canals and on the second surface delimit the interior annular canals.

10. The acoustic absorption structure according to claim 1, wherein the orifices are positioned in the region of the second bottom of at least one interior annular canal.

11. The acoustic absorption structure according to claim 1, wherein the cell comprises orifices positioned in such a way as to cause at least one interior annular canal to communicate with at least one of the contiguous exterior annular canals.

12. An aircraft propulsion system comprising at least one acoustic absorption structure according to claim 1.

* * * * *